United States Patent Office 2,921,096
Patented Jan. 12, 1960

2,921,096

PHOSPHINOBORINE COMPOUNDS AND THEIR PREPARATION

Anton B. Burg, Los Angeles, and Ross I. Wagner, Montebello, Calif., assignors, by mesne assignments, to American Potash & Chemical Corporation, a corporation of Delaware No Drawing. Application June 17, 1957
Serial No. 666,205

15 Claims. (Cl. 260—606.5)

This application, which is a continuation-in-part of our copending application, Serial No. 446,147, filed July 27, 1954, relates in general to phosphinoborines and their production. A divisional application of the aforementioned application Serial No. 446,147, which is identified as Serial No. 754,914, filed August 14, 1958, describes and claims compounds similar to those claimed herein. More particularly, this invention relates to liquid phosphinoborines having certain aliphatic radicals on the phosphorus atom.

The materials ordinarily used in the preparation of polymers are organic in nature and may display unsatisfactory chemical and thermal stability under conditions of specialized usage.

It is therefore an object of this invention to provide a group of basically inorganic polymers having unusual chemical and thermal stability.

A further object of this invention is to provide a method for synthesizing phosphinoborine polymers.

Ancillary objects and advantages of this invention, if not specifically set out, will become apparent during the course of the detailed description which follows.

Broadly, it has been found that polymeric rings of phosphinoborines may be prepared which are unusually stable. They have the general formula:

$$[RR'PBH_2]_n$$

wherein R and R' are any alkyl or alkenyl substituent, at least one of said substituents having at least two carbons.

In the formula, $n$ is a small integer indicative of the degree of polymerization and in the greater portion of the reaction product secured, $n$ is 3 or 4. Lesser amounts of higher polymers are obtained. The requirement that at least one of R or R' represent a radical having two carbons, such that the simplest compound encompassed within the scope of this invention is the compound methylethylphosphinoborine, is important because compounds having at least a single ethyl and a single methyl group on the phosphorus have properties entirely unlike dimethylphosphinoborine. Dimethylphosphinoborine has a melting point of 87 degrees C. and is thus a solid at room temperature. It is therefore suitable only as a dielectric material or in other applications wherein a normally solid polymeric material is desired. However, the simplest of the compounds included within the scope of this invention, the compound methylethylphosphinoborine has a melting point of about −3 to −1 degree C. and thus finds utility where solids are unsuitable.

As a general rule, all compounds having increasingly extended hydrocarbon chains on the phosphorus atom, while continuing to exhibit resistance to high temperatures, become increasingly liquid at lower temperatures with the result that these compounds are especially suited for use as hydraulic fluids in those applications where extremes of temperature are encountered.

Wherever alkenyl substituents are bonded to the phosphorus atom, it is preferred that these double bonded radicals be such that the double bonds themselves are removed at least one and preferably two carbon atoms from the carbon bonded to the phosphorus atom. Where double bonds are found in close proximity to the carbon bonded to the phosphorus, and most specifically where these double bonds serve to link the carbon atom bonded to the phosphorus and the carbon atom next adjacent to the former, the compound resulting will be considerably less liquid than compounds wherein the double bonds are farther removed from the phosphorus atom. It is believed that this is due to the fact that hydrocarbon chains are restricted in their movement where double bonds appear in such close proximity to the phosphorus, the result being a loss of fluidity in the resulting compound. Such less fluid compounds are, of course, less adapted for use as hydraulic fluids.

These products can be prepared by a variety of methods. A secondary phosphine borine may be pyrolyzed whereby to split off one hydrogen from both the phosphorus and the boron atoms with the production of the desired phosphinoborine. Alternatively, the phosphinoborine may be prepared by reacting a phosphonium halide with a borohydride of a metal such as aluminum or preferably an alkali or alkaline earth metal borohydride, such as lithium, sodium, potassium, calcium, magnesium, barium or strontium. Finally, a phosphine haloborine may be dehydrohalogenated to yield the desired phosphinoborines.

More particularly, the preparation of these phosphinoborines can be accomplished in several ways. In one, a secondary phosphine borine is pyrolyzed to effect the loss of one hydrogen each from both the phosphorus and boron atoms. The reaction proceeds in accordance with the equation:

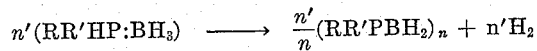

wherein $n'$ indicates the number of molecules present initially and $n$ indicates the number of individual phosphinoborine units joined together to form the ring compound. Where the processes of this invention are followed, the products will be primarily the trimer, a compound having three individual $RR'PBH_2$ units joined one to the next, each individual unit of three being joined through the phosphorus and boron to a phosphorus or boron atom at either end. The trimer, as just indicated, will ordinarily represent the largest portion of the reaction product and has the following structural formula:

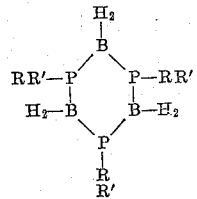

The pyrolysis may be carried out in a refluxing solvent of high boiling point such as n-butyl ether or triethylene glycol dimethyl ether. However, the preferred method of pyrolyzing phosphine borines does not necessitate the use of a solvent. Refluxing a phosphine borine itself in an inert atmosphere is an extremely simple way to remove the hydrogen. No product contamination with a solvent is observed where this method is used. Refluxing until no further hydrogen evolves generally takes a period of about 30–60 minutes. It is advantageous to pass the $H_2$ evolved by the reaction into a mercury bubbler—thus affording a ready method of ascertaining when the reaction is complete. Alternatively, the pyrolysis may be carried out in a flow system.

In the second method, a phosphinoborine is prepared by reacting a phosphonium halide with a borohydride of an alkali metal, an alkaline earth metal or a volatile metal borohydride such as aluminum borohydride. The reaction proceeds in accordance with the equation:

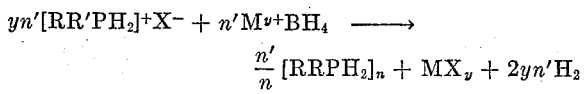

In the above equation, $y$ is a small integer corresponding to the valence of M, which preferably represents aluminum, lithium, sodium, potassium, calcium, magnesium, barium, or strontium; and X is a halogen. The additional symbols are used in the fashion indicated previously.

In the third method, the dehydrohalogenation of phosphine haloborines, the reaction proceeds:

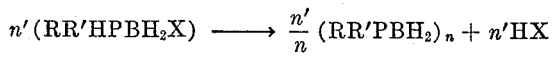

wherein each of the symbols are used in the fashion set out earlier. Thus, the by-product HX is a hydrohalogen acid. This is prevented from displacing the weaker $BH_2$ acid from the reactant phosphine borine to form a phosphonium salt by providing a quantity of a tertiary amine in the reaction vessel. This reacts with the hydrohalogen acid and so removes it from the reaction mixture as a substituted ammonium salt. Where it is desired to prepare phosphinoborine rings having unsaturated substituents on the P atom, this particular method is prefererd. It does not necessitate the use of high temperatures which tend to saturate any unsaturated groups on the phosphorus. As this reaction is not carried out at reflux temperatures, a wide variety of solvents, such as any of the ethers, may be employed.

For example, diethyl ether is readily available and is recommended for use in the process. Another preferred solvent is benzene.

The practice of this invention, both with respect to performing the processes and securing the products thereof, will become apparent from the following examples which are set forth by way of illustration.

EXAMPLE I

A 250 ml. round bottom flask was fitted with an extended neck consisting of a water condenser, gas inlet tube extending to the bottom of the flask, and a gas outlet tube. Into this reaction vessel were distilled 29.4 g. (.0326 mol) of methyl-i-propylphosphine and 25.0 g. (0.329 mol) of methylethylphosphine. The reaction flask was immersed in a Dry Ice slurry at $-78°$ C. and a mixture of diborane and nitrogen was bubbled into the mixed phosphines until diborane appeared with exit gas which passed through a mercury bubbler into a Bunsen burner. After sweeping the apparatus with nitrogen to remove excess diborane, the reaction mixture was gradually heated to $150°$ C.–$170°$ C. resulting in a vigorous evolution of hydrogen gas. After several hours the temperature was raised to $190°$ C. without effecting further gas evolution. A methylethylphosphinoborine methyl-i-propylphosphinoborine copolymer was secured in 89–90% yield.

EXAMPLE II

Into a nitrogen-flushed 1 liter round bottom flask was placed 18.7 g. di-n-butylphosphonium chloride, $[(n-C_4H_9)_2H_2P]^+Cl^-$. The flask was fitted with a reflux condenser, a stirrer and an addition funnel and 300 ml. diethyl ether added thereto. Next, 2.2 g. lithium borohydride, $LiBH_4$, in diethyl ether solution was added. The reactants were refluxed until hydrogen no longer evolved and lithium chloride filtered from the reaction mixture. The solvent was removed by distillation at reduced pressure and a good yield of the di-n-butylphosphinoborine polymer $(n-C_4H_9)PBH_2$, was secured. This illustrates the preparation of dialkylphosphinoborines through the use of the reaction involving a phosphonium halide and a metallic borohydride.

EXAMPLE III

Ethylamylphosphine borine, $C_2H_5(C_5H_{11})HP:BBrH_2$ in the amount of 22.5 g. was placed in a 500 ml. round bottom flask which had previously been flushed with nitrogen. Thereafter 300 ml. of diethyl ether were added followed by 10.1 g. of triethylamine. Triethylammonium bromide was filtered from the reaction mixture and the solvent was removed by distillation at reduced pressure. A high yield of ethylamylphosphinoborine polymers consisting mostly of the trimer $[C_2H_5(C_5H_{11})PBH_2]_3$ was secured.

The stoichiometry for further typical runs wherein a phosphinoborine is dehydrohalogenated to form a product consisting primarily of the trimer with lesser amounts of the tetramer and higher polymers is set forth below in Table 1.

As can be seen from the examples set forth above, a wide variety of products may be secured, all of which are disubstituted phosphinoborines having alkyl and alkenyl chains on the phosphorus of greater length than two carbon atoms.

While phosphine borine materials are used in the examples set forth above, it is to be understood that they may be prepared in accordance with the procedures set forth in our copending application, Serial No. 446,148, filed July 27, 1954, now abandoned, titled "Phosphine Borine Compounds and Their Preparation." The phosphinoborine polymers of this invention are particularly useful as hydraulic fluids because they are liquids over the temperature range where hydraulic fluids are used and because of their aforementioned thermal and chemical stability. They are unusually resistant to thermal decomposition and to oxidative and hydrolytic attack. The most elementary of these polymers has been shown to have a spontaneous ignition temperature in excess of $219°$ C.

Obviously, other modifications and variations of this invention as hereinbefore set forth may be made without departing from the spirit and scope thereof and, accordingly, only those limitations should be imposed as are indicated in the appended claims. For example, the invention is not limited to polymers or individual phosphinoborines, but, as set forth in the examples, includes copolymers between different of the compounds, the method of preparation of such materials being that set forth above for individual phosphinoborines excepting that mixtures of precursors are prepared at the outset.

*Table 1.—Dehydrohalogenation*

| Example No. | Phosphine Haloborine | Grams | Tertiary Amine | Grams | Solvent | Phosphinoborine Trimer Product |
|---|---|---|---|---|---|---|
| IV | $CH_3CH:CHCH_2(C_2H_5)HP:BBrH_2$ | 21.5 | $(C_2H_5)_3N$ | 10 | diethyl ether | $[CH_3CH:CHCH_2(C_2H_5)PBH_2]_3$ |
| V | $C_{12}H_{25}(CH_3)HP:BClH_2$ | 26.9 | $C_5H_5N(CH_3)_2$ | 12.1 | do | $[C_{12}H_{25}(CH_3)PBH_2]_3$ |
| VI | $CH_2:CHCH_2CH_2(CH_3)HP:BBrH_2$ | 19.5 | $(C_2H_5)_3N$ | 10.1 | do | $[CH_2:CHCH_2CH_2(CH_3)PBH_2]_3$ |
| VII | $C_7H_{15}(CH_3)HP:BClH_2$ | 19.4 | $C_5H_5N(CH_3)_2$ | 12.1 | benzene | $[C_7H_{15}(CH_3)PBH_2]_3$ |
| VIII | $n-C_4H_9(C_8H_{17})HP:BBrH_2$ | 29.5 | $(C_2H_5)_3N$ | 10.1 | diethyl ether | $[n-C_4H_9(C_8H_{17})PBH_2]_3$ |
| IX | $n-C_4H_9(C_2H_5)HP:BBrH_2$ | 21.1 | $(C_2H_5)_3N$ | 10.2 | benzene | $[n-C_4H_9(C_2H_5)PBH_2]_3$ |

Information suitable for making further runs using the pyrolysis method of this invention whereby a product is obtained consisting predominantly of the trimer with lesser amounts of the tetramer and higher polymers is set forth in Table 2 below.

*Table 2.—Pyrolysis*

| Example No. | Phosphine Borine | Pyrolysis Temp., °C. | Phosphinoborine Trimer Product |
|---|---|---|---|
| X | $(C_5H_{11})_2HP:BH_3$ | 100–200 | $[(C_5H_{11})_2PBH_2]_3$ |
| XI | $C_2H_5(CH_3)HP:BH_3$ | 250–300 | $[C_2H_5(CH_3)PBH_2]_3$ |
| XII | $(C_2H_5)_2HP:BH_3$ | 300 | $(C_2H_5)_2PBH_2$ |
| XIII | $C_3H_7(CH_3)HP:BH_3$ | 150–220 | $[C_3H_7(CH_3)PBH_2]_3$ |
| XIV | $(n-C_3H_7)_2HP:BH_3$ | 150–220 | $[(n-C_3H_7)_2PBH_2]_3$ |
| XV | $i-C_3H_7(CH_3)HP:BH_3$ | 190 | $[i-C_3H_7(CH_3)PBH_2]_3$ |

The stoichiometry for further typical runs using reactions involving phosphonium halides and borohydrides of certain metals, as described in the example earlier, whereby to yield a product consisting predominantly of the trimer with lesser amounts of the tetramer and other higher polymers is set forth in Table 3 below.

*Table 3.—Phosphonium halide-borohydride reaction*

| Example No. | Phosphonium Halide | Grams | Borohydride | Grams | Solvent | Phosphinoborine Trimer Product |
|---|---|---|---|---|---|---|
| XVI | $[(C_8H_{17})_2H_2P]^+I^-$ | 27.3 | $NaBH_4$ | 3.8 | diethylene glycol dimethyl ether. | $[(C_8H_{17})_2PBH_2]_3$ |
| XVII | $[(C_6H_{13})_2H_2P]^+Cl^-$ | 15.3 | $LiBH_4$ | 2.2 | diethyl ether | $[(C_6H_{13})_2PBH_2]_3$ |
| XVIII | $[(C_3H_7)_2H_2P]^+Cl^-$ | 15.2 | $NaBH_4$ | 3.8 | tetrahydrofuran | $[(C_3H_7)_2PBH_2]_3$ |

We claim:
1. A phosphinoborine polymer having a ring configuration and the general formula $[RR'PBH_2]_n$, wherein R and R' are substituents selected from the group consisting of alkyl having less than 13 carbon atoms and lower alkenyl, at least one of said substituents having at least two carbon atoms and wherein n is an integer from three to four indicative of the degree of polymerization.

2. The polymer of claim 1 wherein both R and R' are said alkyl groups having less than 13 carbon atoms, at least one of which has at least two carbon atoms.

3. A phosphinoborine polymer having a ring configuration and the general formula $[R(CH_3)PBH_2]_n$ wherein R is an alkyl group having at least 2 and less than 13 carbon atoms and wherein n is an integer of from 3 to 4 indicative of the degree of polymerization.

4. A phosphinoborine copolymer having a ring configuration and a general formula $[R(C_2H_5)PBH_2]_n$ wherein R is an alkyl group having less than 13 carbon atoms and wherein n is an integer of from 3 to 4 indicative of the degree of polymerization.

5. A phosphinoborine polymer having a ring configuration and the general formula $[R(C_3H_7)PBH_2]_n$ wherein R is an alkyl group having less than 13 carbon atoms and wherein n is an integer of from 3 to 4 indicative of the degree of polymerization.

6. A phosphinoborine polymer having a ring configuration and the general formula $[R(C_4H_9)PBH_2]_n$ wherein R is an alkyl group having less than 13 carbon atoms and wherein n is an integer of from 3 to 4 indicative of the degree of polymerization.

7. A phosphinoborine polymer having a ring configuration and the general formula $[R(C_{12}H_{25})PBH_2]_n$ wherein R is an alkyl group having less than 13 carbon atoms and wherein n is an integer of from 3 to 4 indicative of the degree of polymerization.

8. The trimeric polymer dibutylphosphinoborine.
9. The trimeric polymer ethylamylphosphinoborine.
10. The trimeric polymer methylethylphosphinoborine.
11. The trimeric polymer diethylphosphinoborine.
12. The trimeric polymer methyl-i-propylphosphinoborine.
13. The trimeric polymer di-i-propylphosphinoborine.
14. The trimeric copolymer methylethylphosphinoborine-methyl-i-propylphosphinoborine.
15. The trimeric polymer dodecylmethylphosphinoborine.

References Cited in the file of this patent

Burg et al.: "Amer. Chem. Soc. Jour.," vol. 75, pp. 3872–7 (1953).

Hewitt et al.: "J. Chem. Soc. (London)," pp. 530–4 (1953), publ. February 1, 1953, received in Patent Office Library April 1, 1953.